July 18, 1950     H. T. PENTECOST     2,515,380
LANDING MECHANISM FOR ROTARY WING AIRCRAFT
Filed Sept. 2, 1947
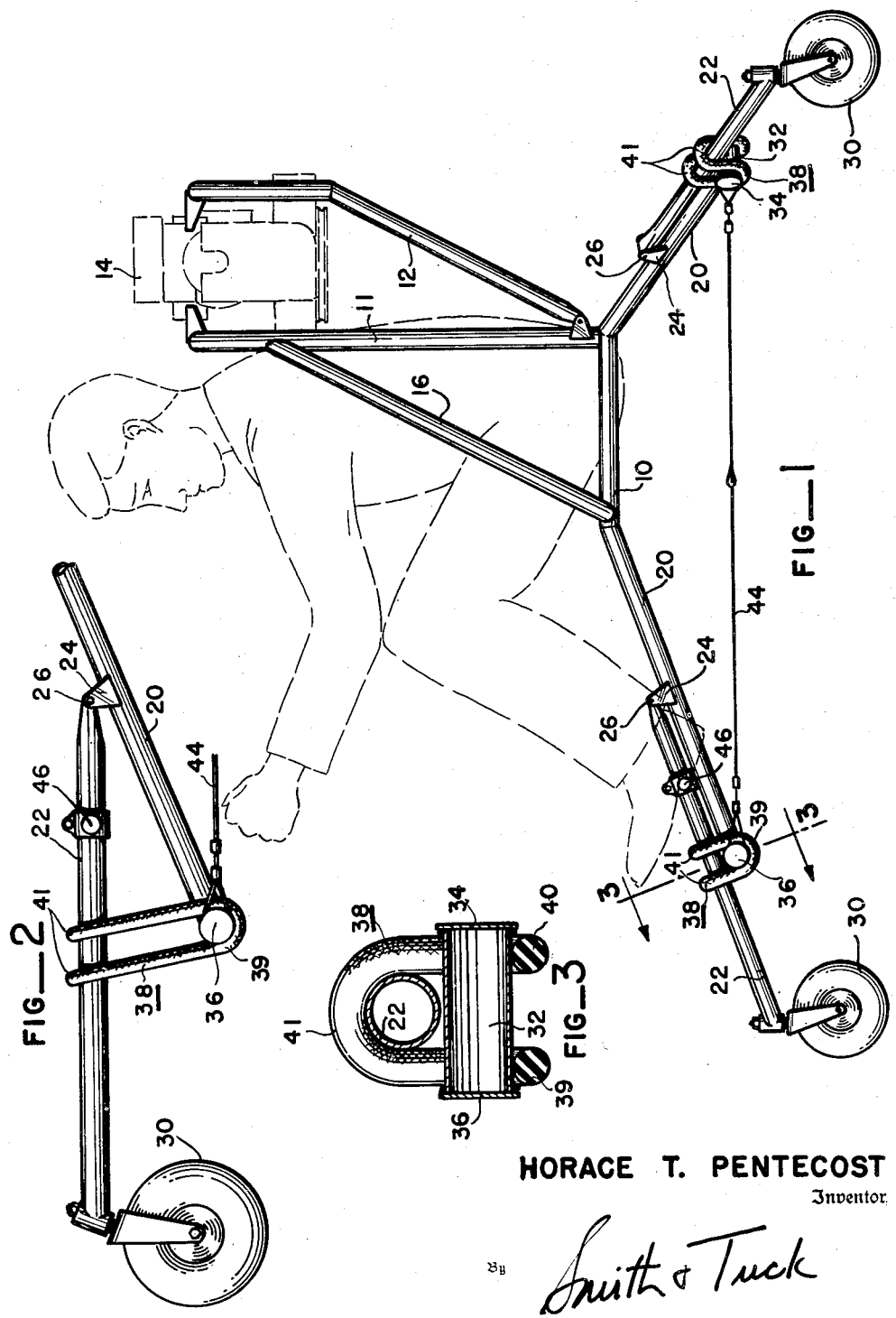
HORACE T. PENTECOST
Inventor
By Smith & Tuck
Attorneys Patented July 18, 1950

2,515,380

UNITED STATES PATENT OFFICE 2,515,380

LANDING MECHANISM FOR ROTARY WING AIRCRAFT

Horace T. Pentecost, Seattle, Wash.

Application September 2, 1947, Serial No. 771,729

1 Claim. (Cl. 244—104)

This invention relates to improvements in a landing mechanism for rotary wing aircraft and, more particularly, to a landing gear for helicopters of the light-weight sport type.

In the beginning of history of aviation, landing gear was of simple form, often comprising skids or runners that permitted the airplane to make sliding contact with the earth. As speeds increased, due to greater power factors, wheels were added and later elaborate pneumatic and hydraulic structures were incorporated between the wheels and the frames.

It appears that much of the thinking current in fixed wing aircraft has been carried over into the field of rotary wing aircraft, whose development has followed more slowly, to the end that current helicopters are burdened with unduly complicated and heavy landing mechanisms and supporting elements which are not adaptable to craft having minimum power factors and simplicity of construction and maintenance for the purpose of reducing the initial investment, as well as the upkeep costs.

It is therefore an important object of this invention to provide a shock-absorbing landing mechanism for aircraft of the rotary wing type that is simply constructed and is thus inexpensive, easily maintained by relatively unskilled personnel, efficient under the circumstances, yet providing a high degree of safety for the craft and pilot during emergency, as well as in normal landing operation.

It is a further object of this invention to provide a landing gear as described that is also adaptable to fixed wing aircraft.

Still another object of the invention resides in the provision of a landing gear for light-weight helicopters that may be incorporated into the frame construction without adding undue weight and bulk.

The foregoing objects and others ancillary thereto I prefer to accomplish as follows:

According to a preferred embodiment of my invention, I provide integral with the frame of an aircraft resiliently flexible leg assemblies which are normally rigid and unflexed, except when absorbing shocks greater than normal. Specifically, the landing mechanism is a pair of overlapping rigid legs that are pivotably joined at one point and resiliently coupled at another point, one of said legs being formed as a rigid part of the aircraft framing and carries, at its outer end, a crosshead. The ground-engaging leg overlies the rigid leg in overlapped relation and is pivotally coupled thereto, preferably intermediate the ends of the rigid leg, so that the cross head lies between the ends of the ground-engaging leg. At the cross-head location, the two legs are resiliently coupled together by means of an annular or toroidal shaped member formed of rubber and commonly designated as a shock cord. This toroid is distorted into a U-shape, so that its legs, which are partially loops, may be engaged around an arm of the cross-head and its intermediate portion will straddle the ground-engaging leg. The action of the coupling element is to resist flexure or angular displacement of the two legs and repeated tests have shown that this construction insures suitable and trouble-free landing gear having a minimum of cost and a maximum of efficiency even under long and hard usage.

The novel features that I consider characteristic of my invention are set forth with particularity in the appended claim. The invention itself, however, both as to its organization and its method of operation, together with additional objects and advantages thereof, will best be understood from the following description of a specific embodiment when read in connection with the accompanying drawings, in which:

Fig. 1 is a view in side elevation of the frame of a sport type helicopter incorporating my shock-absorbing landing gear;

Fig. 2 is a view in enlarged scale illustrating the leg assembly in flexed position; and Fig. 3 is an enlarged cross-sectional view on the line 3—3 of Fig. 1.

A shock-absorbing landing mechanism for aircraft, to meet and overcome the difficulties hereinbefore enumerated, must have at least two totally distinct characteristics; it must be capable of cheap construction to maintain low initial cost; and it must provide a resilient arrangement that will absorb a wide range of shocks without deterioration or a high maintenance cost in hard use.

According to a preferred embodiment of my invention, referring to Fig. 1 of the drawing, I show a helicopter frame, into the landing legs of which is inserted the shock absorbing mechanism. The frame comprises the seat portion 10, above which rise the posts 11 and 12, which cradle the engine 14, above which rise, although not shown, the transmission and rotor elements of the helicopter, as more fully disclosed in my co-pending application, Serial No. 621,254, filed October 9, 1945, now U. S. Patent #2,486,059, issued October 25, 1949. A forward brace 16 joins post 11 to seat portion 10. Customarily, elements 10, 11, 12 and 16 are formed of light-weight aircraft tubing or other suitable tubing welded rigidly together.

Ordinarily, three leg assemblies project outwardly and downwardly from the seat portion 10 of the frame at 120° intervals, to form a tripod landing gear. Under certain circumstances four such legs may be used. The construction is the same in all cases with respect to the components of the individual legs, each of which comprises a rigid leg 20 and the ground-engaging leg 22, which are pivotably joined at the pivot ears 24 by pins 26. In the drawing, the legs 22 are shown as having casters 30, but on occasion these have been dispensed with and the legs given a slight curve or else provided with hemispherical cups upon which the craft lands.

Leg 20 has at its outer end a cross-head 32 rigid therewith and providing horns 34 and 36, which extend a slight degree to each side of the overlying, overlapped leg 22. The legs are resiliently coupled together by means of a shock cord 38 formed of rubber or other resilient material, into a toroid or annulus, which is distorted to an inverted U-shape, so that the looped arms 39, 40, of the U-shape may be engaged around the ends of horns 34 and 36, respectively, and the mid-portion 41 straddles leg 22.

When the craft, in descending, strikes the earth with force greater than gravity, the shock is absorbed by the stretching of the shock cord 38, as depicted in Fig. 2, where an exaggerated angular displacement of the legs 20, 22, is shown. It will be noted that leg 22 is pivoted about the axis of caster 30, permitting pin 26 to travel downward, thus causing the cross-head 32 to leave leg 22 a distance permitted by the shock cord. As the force is dissipated, the shock cord naturally returns the legs to their normal juxtaposition.

Light weight cable struts 44 are shown as extending between the various legs to add rigidity to the frame and to hold the legs rigid therewith. A foot bar 46 is adjustably mounted on leg 22 for the pilot to rest his feet upon, since this craft is a helicopter of the non-enclosed type of Model 102, currently operating under C. A. A. License No. NX-31211. Energy absorption tests conducted in accordance with C. A. B. Civil Air Regulations, Part 0-6 relating to Rotor Craft Airworthiness, prove that the structure shown in approximately the proportion indicated, has safely met and surpassed the minimum requirements, yet with a weight factor that appears much less proportionally than the structures of other rotary-wing craft. It is possible to do so because of the system of levers and shock members here employed.

While I have shown and described particular embodiments of my invention, it will occur to those skilled in the art that various changes and modifications may be made without departing from the invention, and I therefore aim in the appended claim to cover all such changes and modifications as fall within the true spirit and scope of my invention.

Having thus described my invention, I claim:

In a landing mechanism for rotary-wing aircraft, a main frame having a plurality of radial extending shock-absorbing landing assemblies, each said assembly comprising: a leg rigid with said frame and having a cross-head at its outer end; said leg extending from said frame at a downward inclination, a ground-engaging leg overlying said rigid leg in lapped contacting relation, a pivotal connection between the inner end of said ground-engaging leg and said rigid leg, a resilient toroid distorted to U-shape and having each end hooked over an end of said cross-head and its intermediate portion straddling the overlying ground-engaging leg, said toroid serving to resist angular displacement of said legs, and a castered ground-engaging member on said ground-engaging leg operable to permit pivoting of said leg on ground contact.

HORACE T. PENTECOST.

REFERENCES CITED

The following references are of record in the file of this patent:

UNITED STATES PATENTS

| Number | Name | Date |
|---|---|---|
| 1,336,633 | Kleckler | Apr. 13, 1920 |
| 1,776,926 | Noorduyn | Sept. 30, 1930 |
| 1,853,312 | Maiwurm | Apr. 12, 1932 |

FOREIGN PATENTS

| Number | Country | Date |
|---|---|---|
| 443,966 | France | July 26, 1912 |
| 865,973 | France | Mar. 24, 1941 |